US008830834B2

(12) United States Patent
Sharma et al.

(10) Patent No.: US 8,830,834 B2
(45) Date of Patent: Sep. 9, 2014

(54) OVERLAY-BASED PACKET STEERING

(75) Inventors: Govind Prasad Sharma, Union City, CA (US); Dileep K. Devireddy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 13/332,499

(22) Filed: Dec. 21, 2011

(65) Prior Publication Data

US 2013/0163594 A1    Jun. 27, 2013

(51) Int. Cl.
- *H04L 12/28* (2006.01)
- *H04W 72/00* (2009.01)
- *H04W 4/00* (2009.01)
- *H04J 3/24* (2006.01)
- *H04L 12/54* (2013.01)
- *H04L 12/26* (2006.01)

(52) U.S. Cl.
USPC ........... 370/235; 709/202; 709/238; 709/246; 455/450; 455/453; 370/338; 370/349; 370/392; 370/426; 370/469

(58) Field of Classification Search
USPC ................. 370/392, 235, 338, 349, 428, 469; 709/202, 238, 246; 455/450, 453
See application file for complete search history.

(56) References Cited

U.S. PATENT DOCUMENTS

| 7,693,149 B2 * | 4/2010 | Cathey et al. ................. 370/392 |
| 7,895,425 B2 | 2/2011 | Khalid et al. |
| 8,345,682 B2 * | 1/2013 | Pignataro et al. ............. 370/389 |
| 2008/0177896 A1 | 7/2008 | Quinn et al. |
| 2010/0063988 A1 * | 3/2010 | Khalid et al. ................. 709/202 |
| 2010/0074256 A1 * | 3/2010 | Seok et al. .................... 370/392 |
| 2010/0165985 A1 | 7/2010 | Sharma et al. |

* cited by examiner

*Primary Examiner* — Alpus H Hsu
*Assistant Examiner* — Camquyen Thai
(74) *Attorney, Agent, or Firm* — Edell, Shapiro & Finnan, LLC

(57) ABSTRACT

Network topology independent service deployment techniques, referred to as overlay-based packet steering techniques, are provided. In one example, a server destined packet is intercepted by an in-path network device enabled as a service classifier. The service classifier encapsulates the packet and inserts the packet into a service path to a service virtualization endpoint front ending one or more service nodes. In other words, the service virtualization endpoint receives the service-directed packet on an overlay-based service path. The service-directed packet includes a service header and a service overlay tunnel encapsulation. The service virtualization endpoint inspects the service header in the service-directed packet to identify a first service node to which the service-directed packet should be forwarded and, based on the inspection, forwards the service-directed packet, on the overlay-based service path, to the first service node.

30 Claims, 9 Drawing Sheets

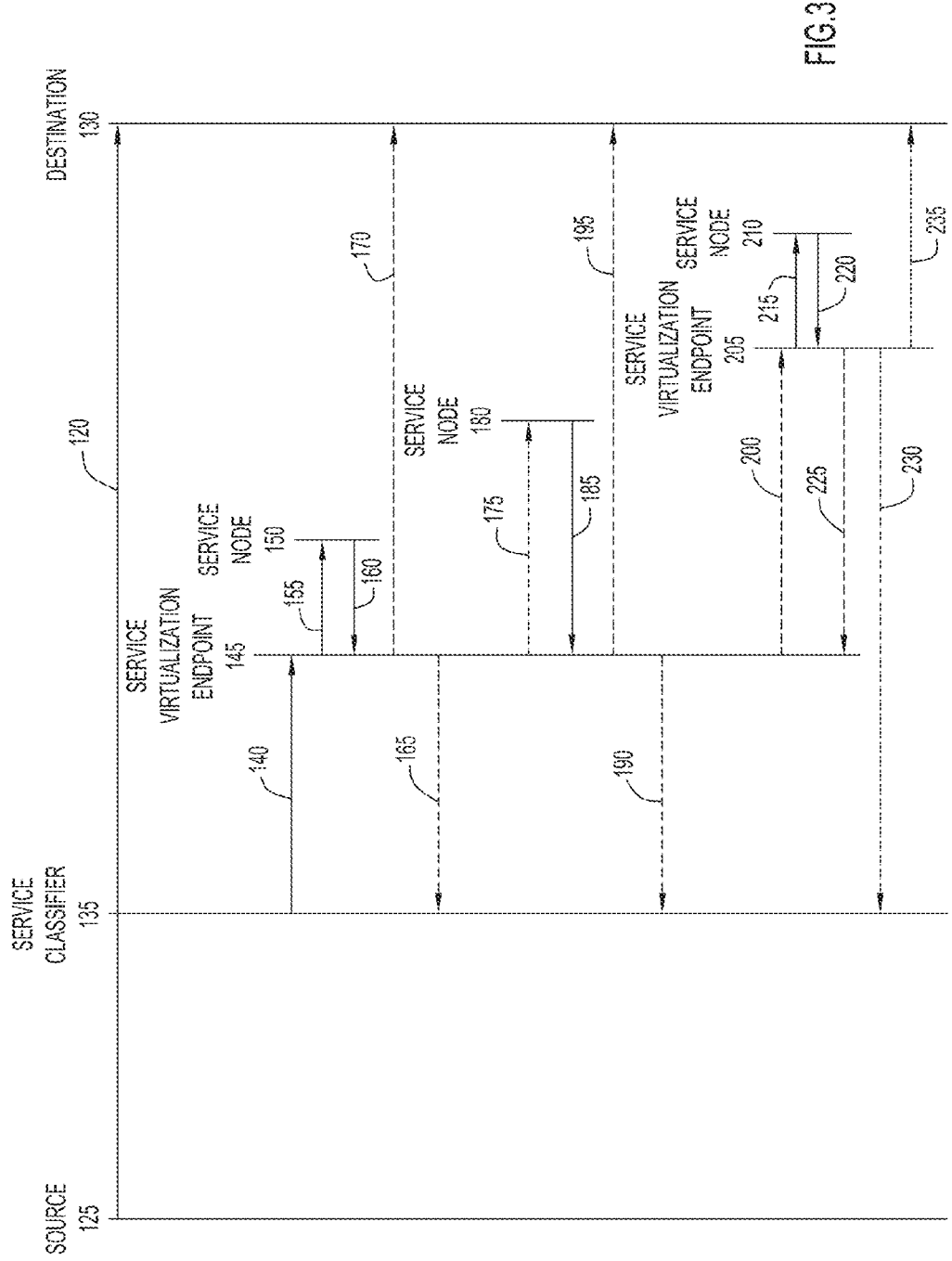

OVERLAY-BASED PACKET STEERING

TECHNICAL FIELD

The present disclosure relates to generally to the insertion of services in a network.

BACKGROUND

In conventional networks, the manner in which services (e.g., firewall, load balancing, etc.) are added or inserted into the network depends on, for example, the type of service, the network topology, etc. There is generally no consistent or uniform way of intercepting and redirecting interested network traffic to the services, and the service insertion results in the modification to the underlying physical and the routing topology of the network to achieve necessary redirection and service chaining functions. This requires overloading and misuse of the network topological resources (e.g., virtual local area networks (VLANs) and Internet Protocol (IP) addresses) for traffic redirection and service stitching purposes which have an adverse impact on the network scalability. As such, systems can suffer from (i) higher deployment costs, (ii) lower network availability, (iii) modified network topology, (iv) additional complexity in network operations and management, and/or (v) inability to use certain services in enterprise, commercial, or service provider networks.

BRIEF DESCRIPTION OF THE DRAWINGS

FIG. 3 is a flow diagram illustrating the deployment of services in accordance with an example overlay-based packet steering technique.

DESCRIPTION OF EXAMPLE EMBODIMENTS

Overview

Generally, disclosed herein are network topology independent service deployment techniques, referred to as overlay-based packet steering techniques. In one example, a server destined packet is intercepted by an in-path network device enabled as a service classifier. The service classifier encapsulates the packet and inserts the packet into a service path to a service virtualization endpoint front ending one or more service nodes. In other words, the service virtualization endpoint receives the service-directed packet on an overlay-based service path. The service-directed packet includes a service header and a service overlay tunnel encapsulation. The service virtualization endpoint inspects the service header in the service-directed packet to identify a first service node to which the service-directed packet should be forwarded and, based on the inspection, forwards the service-directed packet, on the overlay-based service path, to the first service node. After the first service node applies a service to the service-directed packet, the service virtualization endpoint receives, on the overlay-based service path, the service-directed packet back from the first service node. The service-directed packet may then be sent (by inspecting the service header) to one or more additional service nodes for application of services thereto.

Example Embodiments

Figure 1:
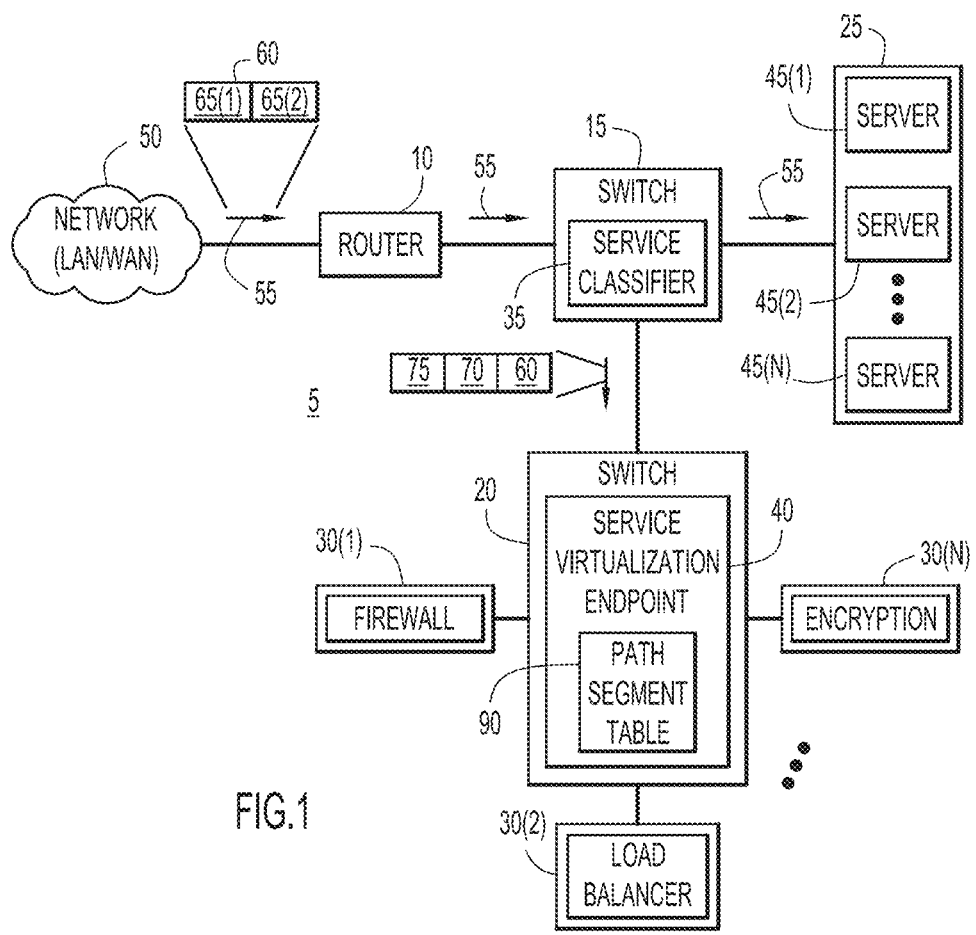
FIG. 1 is a block diagram of a computing network in which services are deployed using an example overlay-based packet steering technique.

FIG. 1 is a block diagram of a computing network 5 having a service overlay configuration (e.g., service insertion architecture (SIA)), configured to implement an overlay-based service traffic steering technique. As shown, the computing network 5 comprises a router 10, a first switch 15, a second switch 20, a server farm 25, and service nodes 30(1)-30(N). Switch 15 comprises a service classifier (SCL) 35, switch 20 comprises a service virtualization endpoint (SVE) 40, and server farm 25 comprises a plurality of servers 45(1)-45(N).

Computing network 5 is a packet switched or packet mode network in which data is transmitted in the form of packets (sometimes referred to as datagrams, segments, blocks, cells or frames) according to predefined protocols, such as the Transmission Control Protocol/Internet Protocol (TCP/IP). A sequence of one or more packets transmitted from a source to a destination is referred to as a network flow or, more simply, traffic. In the example of FIG. 1, router 10 and switch 15 are configured to bi-directionally transfer traffic between servers 45(1)-45(N) and one or more other devices connected to network 50. Network 50 may be, for example, a local area network (LAN) or a wide area network (WAN) (e.g., the Internet). The traffic (network flow) between servers 45(1)-45(N) and network 50 is shown using arrows 55. Merely for purposes of illustration, traffic 55 is shown as being received by router 10 from network 50.

As noted, the received traffic 55 includes one or more packets 60. Packets 60 generally include control information 65(1) and actual data (also known as payload) 65(2). The control information 65(1) is data that in-path network devices (e.g., switch 15, router 10, etc.) use to forward the packet from a source to a destination, and may comprise, for example, source and destination addresses, error detection codes (i.e., checksums), sequencing information, etc. This control information 65(1) is generally found in a portion of the packet referred to as the packet header (i.e., the information that precedes the actual data within the packet) and/or the packet trailer (i.e., the information that follows the actual data within the packet).

Router 10 is a network device that functions as the edge device for communication over the network 50. Switch 15 is a network device that uses a combination of hardware and/or software to direct packets to one or more of servers 45(1)-45(N). Router 10 and switch 15 are both referred to herein as "in-path" network devices because they reside in the path of the bi-directional traffic 55 transmitted between network 50 and server 45(1)-45(N).

In certain circumstances, there may be a desire to subject a portion of traffic 55 to one or more services. That is, there is a desire to insert or deploy services into the computing network 5 to operate on the traffic 55. As used herein, a "service" can include any layer 3 through layer 7 applications that reside, for example, on top of layer 2 switching and/or layer 3 routing services. More particularly, a service can be a desired or optional function that may be performed within a network that provides value to a manager or user of computing network 5. Examples of such services include, but are not limited to, firewall operations, load balancing, encryption, decryption, specialized routing, intrusion management, accounting, etc. Generally, a service is a service features that can manipulate packets in a manner other than packet forwarding.

In conventional arrangements, there generally is no consistent or uniform way to add services to a computing network. Moreover, conventional service insertion techniques result in the need to modify the underlying physical and the routing topology of the network to achieve necessary traffic redirection and service chaining functions and/or or require the services to stay within the path between the clients and the servers. That is, the conventional service insertion techniques are service and network topology dependent. Techniques of FIG. 1 are directed to a topology independent, and network agnostic, mechanism for service insertion (i.e., to achieve network traffic redirection and service chaining functions) in emerging cloud and traditional service deployments. More specifically, these new techniques, sometimes referred to herein as overlay-based traffic steering techniques, utilize an overlay-based service path over which packets are transmitted to a service virtualization endpoint, and ultimately the desired services. As described below, the overlay-based service path will generally comprise a plurality of hops separated by path segments.

In accordance with the overlay-based traffic steering techniques, switch 15 first comprises a service classifier (SCL) 35. The service classifier 35 is generally a data plane element on switch 15 that, as described below, is configured to analyze traffic 55 to determine what portions of the traffic should be subjected to services. The traffic that should be subjected to services is referred to herein as service-directed traffic. Also as described below, service classifier 35 is further configured to add new headers of this service-directed traffic for transmission along the overlay-based service path, and to redirect the service-directed traffic to services along the service path.

In FIG. 1, service classifier 35 is shown on switch 15. However, it is to be appreciated that the service classifier functionality may be implemented on other in-path network devices. That is, a service classifier may be a layer 3 service classifier (i.e., implemented on a layer 3 enabled device such as a router or layer 3 switch) that is configured to intercept Internet Protocol (IP) routed traffic in the network, or a layer 2 service classifier (i.e., implemented on a layer 2 enabled device such as an access switch) that is configured to intercept Ethernet bridged traffic in the network. As such, in alternative arrangements, service classifier 35 could be implemented on router 10 or another in-path network device.

Service classifier 35 comprises the start of the overlay-based service path, and is configured to perform a number of different functions. More specifically, the service classifier 35 is configured to intercept traffic 55 and to determine if any portion of traffic 55 is service-directed traffic (i.e., if any of the packets should be subjected to one or more services). For any identified service-directed traffic, service classifier 35 is configured to add a service header to the specific packets. The service header includes the path information and is used in the data plane to forward the packets along the overlay-based service path. The inserted service header corresponds to the service path to which the packet is redirected. In one example, the service header is a new header that is added to service-directed packets. In an alternative example, the service header is "added" by reformatting the existing header of the packet. The packet will include the service header, the original payload and, in certain circumstances, the original header. Further details of the service header are provided below.

For any identified service-directed traffic, the service classifier 35 is further configured to add the appropriate data plane encapsulation (transport tunnel) to the packets for transport along a path segment in the overlay-based service path. As used herein, a path segment is an overlay connection between two overlay "hops" (i.e., overlay network devices) in the service path. A path segment may be formed between layer 2 or layer 3 adjacent hops and, as such, the data plane encapsulation provided by the service classifier 35 is based on the type of the next data path segment over which the packets are going to be transmitted. That is, if the subsequent path segment comprises only one or more a layer 2 hops, the encapsulation may be a layer 2 encapsulation. If the subsequent path segment comprises only one or more layer 3 hops, the encapsulation may be a layer 3 encapsulation. A schematic example of a packet 60 having a service header 70 and an encapsulation 75 is shown in FIG. 1. Further details of the service header and the encapsulation are provided below with reference to FIGS. 2A and 2B In the example of FIG. 1, the first path segment in the overlay-based service path is between service classifier 35 of switch 15 and service virtualization endpoint 40 of switch 20. That is, service classifier 35 is configured to intercept service-directed packets of traffic 55, reformat the service-directed packets for the overlay-based service path (i.e., add the service header and encapsulate the packet), and transmit the reformatted packet to service virtualization endpoint 40. Service virtualization endpoint 40 is a data plane element that is hosted on switch 40 that is configured to operate as the front end for one or more service nodes 30(1)-30(N). In other words, as described below, service virtualization endpoint 40 functions as an overlay data traffic hub for service nodes (spokes) 30(1)-30(N) and provides common network and overlay data plane function offloads to the service nodes.

Service nodes 30(1)-30(N) are data plane elements that hosts service features. Examples of service nodes are physical appliances such as an Adaptive Security Appliance (ASA), Applicant Control Engine (ACE), Wide Area Application Services (WAAS), or virtual service nodes such a virtual ACE (vACE), etc. In the specific example of FIG. 1, service node 30(1) hosts firewall services, service node 30(2) hosts load balancer services, and service node 30(N) hosts encryption services. It is to be appreciated that these services are merely illustrative and that other services may be implemented in different examples (i.e., IPS, WAAS, etc).

In operation, service nodes 30(1)-30(N) may perform a number of different data plane functions such as, for example, receiving and processing packets with transport tunnel and service header encapsulations, establishing service policies from received service header, and enforcing service policies to the packets. As detailed below with reference to FIG. 2C, the service header may include, for example, a sequence number and a hop limit. The sequence number associated with a service represents its relative order with respect to other services in the service path. For example, the first service on the path will be assigned a sequence number of 1; the second service will be assigned a sequence number of 2; and so on. The service classifier 35 is always assigned a sequence number of zero indicating it is the start of the service path. As such, service nodes 30(1)-30(N) may update the service header by rewriting its own sequence number and/or decrementing the hop-limit. Service nodes 30(1)-30(N) may also any drop data packets received with a hop-limit of 1 (or below). After application of the service, service nodes 30(1)-30(N) are configured to return the packets back to service virtualization endpoint 40 for service chaining, delivery to the original destination, or return to the service classifier 35.

The service nodes 30(1)-30(N) may be modules of a network device, a physical or virtual appliances, etc. To simplify the service deployments, techniques described herein generally have the service nodes 30(1)-30(N) as layer-2 adjacent from the server virtualization endpoint 40. However, if layer 3 adjacency from the service classifier 35 to a service node 30(1)-30(N) is desired, the server virtualization endpoint 40 can provide such adjacency while maintaining transparency of the services. As noted above, the service classifier 35 and the server virtualization endpoint 40 can be either layer-2 or layer-3 adjacent from each other.

As noted above, service virtualization endpoint 40 comprises the second overlay hop in the overlay-based service path, and receives the encapsulated packets from service classifier 35. As described further below, service virtualization endpoint 40 may be configured to perform one or more different functions, including operating as a service overlay tunnel (e.g., L3 Generic route encapsulation (GRE)) termination for packets directed to specific service nodes 30(1)-30(N). That is, virtualization endpoint 40, rather than service nodes 30(1)-30(N), includes the functionality needed to receive packets from, for example, remote layer 3 devices. The virtualization endpoint 40 is thus configured to process such packets and forward them along to the appropriate service.

In operation, the server virtualization endpoint 40 receives the packet from the service classifier 35 and inspects the service header to determine which particular service node 30(1)-30(N) should receive the packet. The server virtualization endpoint 40 then sends the packet to the particular service node. The particular service node performs the desired function (service), and sends the packet back to the server virtualization endpoint 40. The server virtualization endpoint 40 then again inspects the service header in the packet to determine where to next send the packet.

One functionality of service virtualization endpoint 40 is to provide service chaining of packets. More specifically, in certain circumstances, a packet may be directed to multiple services that are to be performed in a sequential order. In these circumstances, virtualization endpoint 40 is configured to inspect/analyze the service header 70 of packet 60 and, based on the results of the analysis, deliver the packet to a first service node, such as service node 30(1). Once the first service node 30(1) applies the desired service, the service node is configured to transmit the packet 60 back to service virtualization endpoint 40. Service virtualization endpoint 40 again inspects the service header 70 to determine if any services are desired. If so, service virtualization endpoint 40 will transmit the packet 60 to the next desired service. This process continues until all desired services have been completed. After completion of all desired services, the server virtualization endpoint 40 can either send the packet back to the service classifier 35 (i.e., the network device that originally intercepted the packet) or it can send the packet off to the original destination (server or client). Prior to sending the packet to the original destination, the server virtualization endpoint 40 can remove the service overlay encapsulation added by the classifier (i.e., decapsulate the packet).

To achieve the above and other functions (e.g., load distribution of data traffic to service node cluster), the service virtualization endpoint 40 data plane maintains a path segment table 90 containing the mappings of service headers to the next hop(s). More specifically, the path segment table 90 is a service traffic-forwarding table, which is maintained at each overlay data plane device. The path segment table 90 stores the information about the path segment entries used by the overlay devices to process the service overlay encapsulated packets directed to them. Each entry contains mapping of a service header (received from previous hops) to a next hop tunnel adjacency. The path segment table 90 is distributed to service virtualization endpoint 40 by a central control point. The central control point is a component in the computing network 5 that is configured to discover service overlay enabled devices, assign them into service paths, and send provisioning requests to them to auto-provision data plane policies. The control point is also configured to allocate service headers for service paths and distributing them to the devices as part of path segment table updates.

The service virtualization endpoint 40 uses the path segment table 90 to lookup the next hop adjacencies using the service header in the received packets. The adjacency contains the next hop tunnel rewrite information, which the service virtualization endpoint 40 uses to rewrite the incoming tunnel header in the received packet. The service header lookup uses a service path identifier (ID) and a sequence number (in the service header), and causes the service virtualization endpoint 40 to undertake one or more different actions. In one example, the lookup causes the service virtualization endpoint 40 to perform basic service chaining. In this case, the table lookup results in a unique next hop tunnel encapsulation, which is used to rewrite the incoming data packet transport header in order to redirect the packet to the next hop. As detailed below, the tunnel header can be, for example, Ethernet (for layer 2 adjacency) or IP/Generic route encapsulation (GRE) (layer 3 adjacency), depending on the next hop adjacency.

In another example, the lookup causes the service virtualization endpoint 40 to perform load shared service chaining. In this case, the table lookup results in a group of next hop adjacencies. Each next hop adjacency leads to a member of the service cluster group. The lookup causes the service virtualization endpoint 40 data plane to additionally apply a load share algorithm using the incoming packets layer 3/layer 4 header (i.e., IP, TCP, and/or User Datagram Protocol (UDP)) fields to generate a load share hash to select one of the members in the group. The service virtualization endpoint 40 then uses the adjacency associated with the selected member to rewrite the received tunnel encapsulation and redirects the rewritten packet to the next hop member service node.

In a still other example, the lookup causes the service virtualization endpoint 40 to deliver packets to the original (final) destination. In this case, the table lookup results in a NULL next hop, which denotes that the packet needs to be forwarded to the original destination. In the example of FIG. 1, service virtualization endpoint 40 would deliver the packets to one or more of servers 45(1)-45(N). This will occur when the packet is returning from the last service node in the service path. The service virtualization endpoint 40 removes the tunnel and service header encapsulations received in the incoming packet and delivers (by routing) the native packet to the original destination. For routing table instance determination, it uses, for example, the virtual private network routing and forwarding (VRF) ID derived from the service path ID received in the service header.

FIG. 1 illustrates an example using one service virtualization endpoint 40. It is to be appreciated that more than one service virtualization endpoint may be used, within the same or different service paths, in an alternative computing network. In one such example, each service virtualization endpoint in the same service path may cater to a separate group of service nodes. Therefore, the services in such an arrangement may be distributed across different computing pods, or even different data centers, and locally managed by the service virtualization endpoints to which they are connected to in the pod. It is also to be appreciated that the same service path can span across services hosted on different service virtualization endpoints.

In certain deployments, the service nodes will be inserted into the network in layer-2 adjacency from the service virtualization endpoint hosting switch over a service virtual local area network (VLAN). The service VLAN is used to carry the encapsulated traffic between the service virtualization endpoint hosting switch and the service nodes. This approach of confining the services only to the dedicated VLAN assists in making the insertion of the services topology independent, and avoids impacting existing design of customer networks. Although layer 2 adjacency between service nodes and the service virtualization endpoints is used in certain examples, there are other circumstances in which there is a desire to have the service virtualization endpoint and the service nodes be layer 3 adjacent from each other. The techniques described herein support operation for both layer 2 and layer 3 adjacencies between a service virtualization endpoint and service nodes.

As noted above, the service nodes 30(1)-30(N) receive the packet 60 from the service virtualization endpoint 40, apply their services, and then return the packet back to the service virtualization endpoint 40 for forwarding to the next hop. One advantage of the service virtualization endpoint 40 is that it provides separation and offload of the common network and data plane functions from the services. As such, a service virtualization endpoint may be viewed as a shim layer that provides an interface to its local services to the domain of the computing network 5.

Figure 2A:
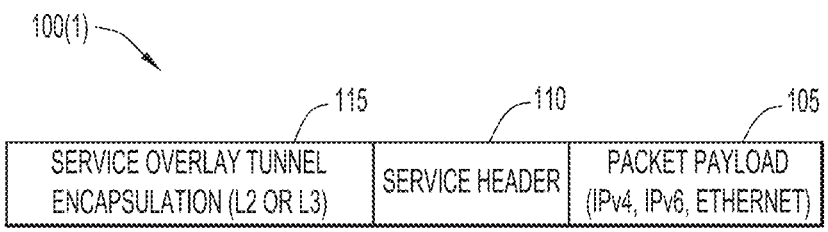
FIGS. 2A and 2B are schematic diagrams of example service-directed packets encapsulated in accordance with example overlay-based packet steering techniques.
Figure 2B:
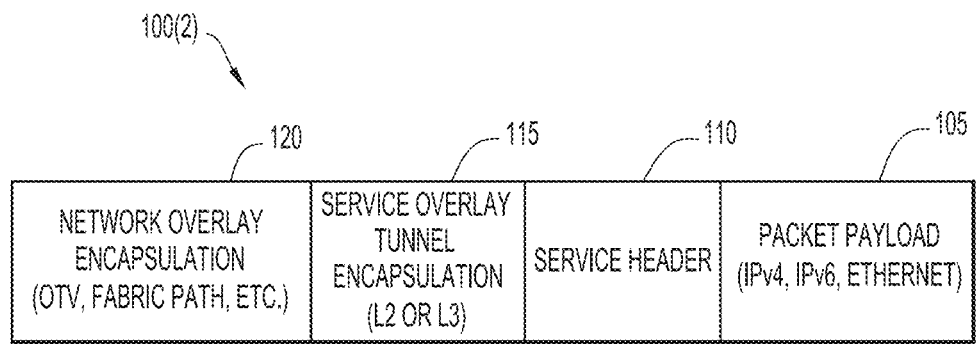

FIGS. 2A and 2B are two examples of encapsulated serviced-directed packets that may be generated by the service classifier 35 in accordance with the overlay-based traffic steering techniques described herein. FIG. 2A illustrates a first encapsulation to generate an encapsulated packet 100(1), while FIG. 2B illustrates a second, different encapsulation, to generate an encapsulated packet 100(2).

The packets 100(1) and 100(2) each include a payload 105. The payload may be, for example, layer 3 IP (e.g., Internet Protocol version 4 (IPv4) and/or Internet Protocol version 6 (IPv6)), or layer 2 Ethernet. Layer 3 payload is carried when the service classifier 35 intercepts the routed traffic at the layer-3 boundary (typically at the distribution layer) of the network. Layer 2 payload is carried when the service classifier 35 intercepts the bridged layer-2 traffic at the layer-2 boundary (access layer) of the network.

As noted above, service classifier 35 adds a service header 110 to each of packets 100(1) and 100(2). The service header 110 primarily carries explicit service path information in the data plane that enables topology independent service traffic steering. Additionally, the service header 110 may, for example, indicate the desired services, carry tenant/traffic classification context from the service classifier 35 to service nodes 30(1)-30(N), or provide an indication of the type of carried payload (i.e., indicate if the payload is layer 2 or layer 3 ). The service header 110 may also enable topology independent service chaining (service path forwarding), topology independent service policy associations, Operation, Administration, and Maintenance (OAM) packet indication, packet loop detection, and re-creation of the network-forwarding context for packet delivery to the original destination at the end of the chain.

Figure 2C:
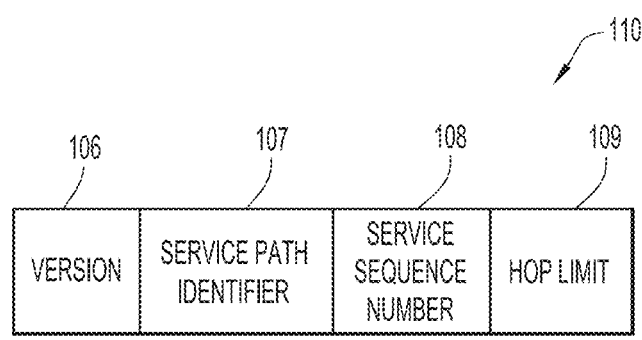
FIG. 2C is a schematic diagram of an example service header in an encapsulated packet in accordance with FIGS. 2A or 2B.

FIG. 2C is a schematic diagram of a service header 110. As shown, the example service header 110 includes a version 106, service path identifier 107, a service sequence number 108, and a hop limit 109. The version 106, service path identifier 107, service sequence number 108, and hop limit 109 are described elsewhere herein.

In accordance with the techniques described herein, the service header may take a number of different forms. In one example, the service header is a stack of one or more 4 byte service overlay tags. The upper (topmost) tag is used for the data plane forwarding and the other tags may be used for various options.

In certain circumstances, each tag in the service header is 32 bits long and may include, for example, a version number (2 bits) that indicates the version of the service overlay service header (which is set to 1 by the service classifier) and a payload indication (1 bit) that represents the type of payload carried inside the packet. A "1" indicates a layer-2 payload, while a "0" indicates a layer 3 payload. This is set by the service classifier appropriately. The tag may also include an OAM indication (1 bit) that, if set to "1" indicates it is an OAM packet. If the OAM packet is meant for the service, it responds with an appropriate reply, else it just forwards it like any other service overlay data packet.

A tag in the service header may also include a service path identifier (15 bits) that may be an integer value between 1 and 32,000 that represents an instance of a service overlay service path. This identifier is also used by the service classifier and the service virtualization endpoint to derive routing context (e.g., VRF ID at the end of the chain). The service path identifier also reflects the traffic classification of the redirected traffic, and the services use the identifier to establish associated service policies for the redirected traffic.

Also included in a service header tag are a service sequence number (4 bits), a No Following Context (NC) indication (1 bit), reserved bits (4 bits), and a hop limit (4 bits). The service sequence number represents logical order number (position) of the last service applied to the packet in the service path. Each service in a service path is assigned a unique sequence number by the control point indicating its relative ordering in the path. The service updates the sequence number field in the received service header with its own sequence number before handing over the packet to the service virtualization endpoint. Together with the service path ID, the service sequence number in the received service header is used to uniquely determine the next hop by the data plane devices (service virtualization endpoint and service classifier). The NC represents if one or more optional contexts are following the service overlay top 32-bit tag. If set to "1", no following context is present, while "0" indicates one or more contexts are present. The hop limit represents the maximum number of hops that a packet can traverse in a service path and is used to prevent loops in a service path. The service classifier sets it to a maximum value, typically same as the number of services in the service path. It is decremented at each service hop in the service path.

As noted above, the above description for a service header is merely illustrative and that a service header may take one or more other different arrangements.

As noted above, the service classifier 35 also adds a service overlay tunnel encapsulation 115 that, also noted above, may be a layer 2 service overlay tunnel encapsulation or a layer 3 service overlay tunnel encapsulation. More generally, the encapsulation 115 is one or more transport tunnel encapsulation headers used to redirect the service-directed traffic to next overlay hops over a variety of underlying network segmentation technologies (e.g., Institute of Electrical and Electronics Engineers (IEEE) 802.1Q (Dot1Q), Multiprotocol label switching (MPLS), IP, etc.) and adjacencies. The encapsulation 115 is shared between two peer hops (e.g., service classifier 35 and service virtualization endpoint 40) to multiplex multiple chain/path instances traffic flowing between them. The service overlay transport encapsulations 115 used in data plane are specific to the next hop adjacency (e.g., layer 2 adjacent encapsulation, layer 3 adjacent encapsulation, etc.) The layer 2 encapsulation uses native Ethernet encapsulation for service overlay packet delivery to the next hop. The service overlay packets encapsulated using this transport type are bridged to the next hop using destination MAC address in the Ethernet header in the underlying layer-2 network. This is used if the next hop is reachable within a layer-2 boundary/subnet (i.e., located within the same layer-2 service overlay segment as the previous hop). The layer 3 adjacent encapsulation uses overlaid IP/GRE encapsulation for service overlay packet delivery to next hop. The service overlay packets encapsulated in an outer IP/GRE header are routed to the next hop using destination IP address of the outer IP header in the underlying layer-3 network. This is used if the next hop is reachable across the layer-3 boundary (i.e., located across layer-2 service overlay segment boundary as the previous hop). It is to be appreciated that layer 3 encapsulation may, in certain circumstances, be used between layer 2 hops.

In one specific example, a layer 2 service overlay tunnel encapsulation may comprise the destination MAC address (6 bytes), the source MAC address (6 bytes), optionally a VLAN Dot1Q tag (4 bytes), and the service overlay ethertype (2 bytes). The destination MAC address is the layer 2 data plane address of the next service overlay hop. The source MAC address is the layer 2 data plane address of the service overlay hop redirecting the packet to the next service overlay hop. The optional Dot1Q tag is the dedicated service VLAN for service overlay encapsulated traffic. In case of a DoubleQ (2 Q tags segment ID) based segmentation used for service overlay segment, this will be a DoubleQ tag (8 bytes instead of 4 bytes). It is to be appreciated that this encapsulation is merely illustrative and that other layer 2 encapsulations may be used in alternative arrangements.

In another specific example, a layer 3 service overlay tunnel encapsulation may comprise the destination MAC address (6 bytes), the source MAC address (6 bytes), optionally a VLAN Dot1Q tag (4 bytes), an IP ethertype (2 bytes), an IP header, and a GRE header. The destination MAC address is the layer 2 data plane address of the next service overlay hop. The source MAC address is the layer 2 data plane address of the service overlay hop redirecting the packet to the next service overlay hop. The Dot1Q tag is the in-transit layer 2 network VLAN between the peer routing hops. In case of DoubleQ (2 Q tags segment ID) based segmentation, this will be a DoubleQ tag (8 bytes instead of 4 bytes). The IP header is the outer transport tunnel IP header and may include the source IP address (e.g., the data plane address of the service overlay hop redirecting the packet) and the destination IP address (i.e., the address of the service overlay hop receiving the packet). The GRE Header carries the service overlay protocol type.

In certain circumstances, the service overlay encapsulated packet may need to be delivered over a network overlay technology such as overlay transport virtualization (OTV) or Fabric Path. In this case, as shown in FIG. 2B, a network overlay header encapsulation 120 is added before the service overlay encapsulation.

It is to be appreciated that the packet formats and encapsulations described herein are generally applicable to the service overlay enabled devices (i.e., the service classifiers, service virtualization endpoints, and service nodes) in the network. The service overlay enabled devices add, remove and/or manipulate the service overlay encapsulations. Any in-transit network device (a switch or a router) that happens to be in path of the encapsulated traffic, merely forwards packets (bridges or routes) using the overlay tunnel header destination addresses.

FIG. 3 is a flow diagram illustrating the insertion of services in accordance with an example overlay-based packet steering technique. In this example, a network flow (traffic) 120 is transmitted from a source 125 to a destination 130. A service classifier 135, hosted on an in-path network device, is configured to analyze traffic 120 as it passes through the network device. Service classifier 135 is configured to intercept any service-directed packets in traffic 120 and, as shown by arrow 140, transmit those service-directed packets to a service virtualization endpoint 145 on an overlay-based service path. The overlay-based service path is a method for transmitting the packets through the use of the service header and a service overlay tunnel encapsulation, as described above.

Service virtualization endpoint 145 receives the encapsulated packet on the overlay-based service path, performs a decapsulation, and performs a lookup in a path segment table (FIG. 1) with a received service header ID (in the service header) to determine the next hop in the service path. In this example, service virtualization endpoint 145 determines that a service on service node 150 is the next hop. As such, service virtualization endpoint 145 rewrites the service overlay tunnel encapsulation to redirect the packet to service node 150. As noted above, the format of the re-written service overlay tunnel encapsulation (i.e., layer 2 or layer 3 encapsulation) depends on if the service node is layer 2 or layer 3 adjacent to the service virtualization endpoint 145. The forwarding of the packet to service node 150 is shown using arrow 155.

The service node 150 establishes service policies using information in the service header and/or enforces associated service features on the packet. After processing, the service node 150 updates the sequence number in the service header and returns the packet back to the service virtualization endpoint 145, as shown by arrow 160.

When service virtualization endpoint 145 receives the packet back from the service node 150, the service virtualization endpoint 145 performs a lookup in the path segment table using service header ID to determine the next hop for the packet. As a result of this lookup, the service virtualization endpoint 145 may return the packet to the service classifier (shown by arrow 165), send the packet to the original destination 130 (shown by arrow 170), or send the packet to a second service node 180 (shown by arrow 175). In this example, the lookup results in a determination that the next hop is a service on service node 180. As such, the service virtualization endpoint 145 rewrites the service overlay tunnel encapsulation to redirect the packet to service node 180.

Similar to the above example, the service node 180 establishes service policies using information in the service header and/or enforces associated service features on the packet. After processing, the service node 180 updates the sequence number in the service header and returns the packet back to the service virtualization endpoint 145, as shown by arrow 185.

When service virtualization endpoint 145 receives the packet back from service node 180, the service virtualization endpoint 145 performs a lookup in the path segment table using service header ID to determine the next hop for the packet. As a result of this lookup, the service virtualization endpoint 145 may return the packet to the service classifier (shown by arrow 190), send the packet to the original destination 130 (shown by arrow 195), send the packet to a third service node (not shown), or send the packet to a second service virtualization endpoint 205 (shown by arrow 200). In this example, the lookup results in a determination that the next hop is the second service virtualization endpoint 205. As such, the service virtualization endpoint 145 rewrites the service overlay tunnel encapsulation to redirect the packet to service virtualization endpoint 205.

When service virtualization endpoint 205 receives the packet from service virtualization endpoint 145, the service virtualization endpoint 205 performs a lookup in the path segment table using service header ID to determine the next hop for the packet. In this example, service virtualization endpoint 205 determines that the next hop is service node 210. As such, the service virtualization endpoint 205 rewrites the service overlay tunnel encapsulation to redirect the packet to a service on service node 210. The forwarding of the packet to service node 210 is shown using arrow 215.

Similar to the above examples, the service node 210 establishes service policies using information in the service header and/or enforces associated service features on the packet. After processing, the service node 210 updates the sequence number in the service header and returns the packet back to the service virtualization endpoint 205, as shown by arrow 220.

When service virtualization endpoint 205 receives the packet back from service node 210, the service virtualization endpoint 205 performs a lookup in the path segment table using service header ID to determine the next hop for the packet. As a result of this lookup, the service virtualization endpoint 205 may return the packet to service virtualization endpoint 145 (shown by arrow 225), return the packet to the service classifier (shown by arrow 230), send the packet to the original destination 130 (shown by arrow 235), or send the packet to a third service node (not shown). In this example, the lookup results in a determination that the service path has ended and that the packet should be forwarded to the original destination 130.

Merely for purposes of illustration, the overlay-based traffic steering techniques have been described, in the context of FIG. 1, with reference to a simplified diagram of a computing network 5. It is to be appreciated that the overlay-based traffic steering techniques are not limited to any type of network topology and, as noted above, are generally network topology independent. As such, it is to be appreciated that the aspects described herein with reference to computing network 5 of FIG. 1 may be implemented in conjunction with different network topologies. FIGS. 4-7 provide examples of alternative computing network topologies in which the overlay-based traffic steering techniques may be implemented.

Figure 4:
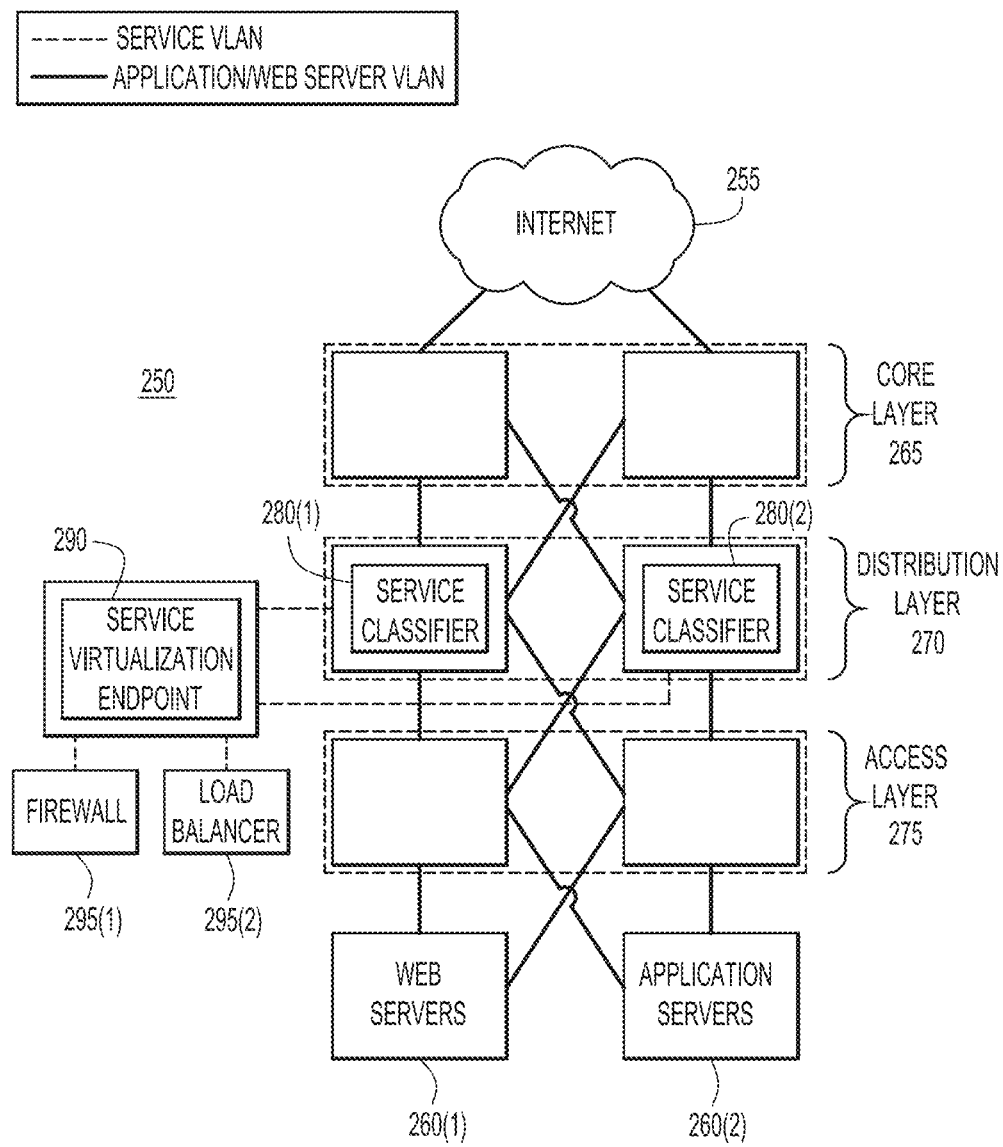
FIG. 4 is a block diagram of a computing network in which services are deployed using an example overlay-based packet steering technique.

More specifically, FIG. 4 is an example of a computing network 250 having a service overlay topology in which the hops in the service path are layer 2 adjacent. In this example, traffic is bi-directionally transmitted between devices connected to the internet 255 and servers 260(1) and/or servers 260(2). Servers 260(1) are web servers and servers 260(2) are application servers. As shown, the traffic passes through a core layer 265, a distribution layer 270, and an access layer 275. In this example, service classifiers 280 are at the network devices of the distribution layer 270. Similar to the examples described above, service classifiers 280 intercept service-directed packets and transmit these packets to service virtualization endpoint 290 (on an overlay-based service path) for distribution to one or more of service nodes 295(1) or 295(2).

As noted above, in the topology of FIG. 4, the hops are all layer 2 adjacent (i.e., .e. reachable in same layer-2 bridge domain). As such, a layer 2 service overlay tunnel encapsulation is used in the service path. More specifically, a dedicated layer-2 bridge domain (service VLAN), different from the network segments used to partition the data center, is used to achieve layer-2 adjacency between peer service overlay devices for communication in the data plane.

Figure 5:
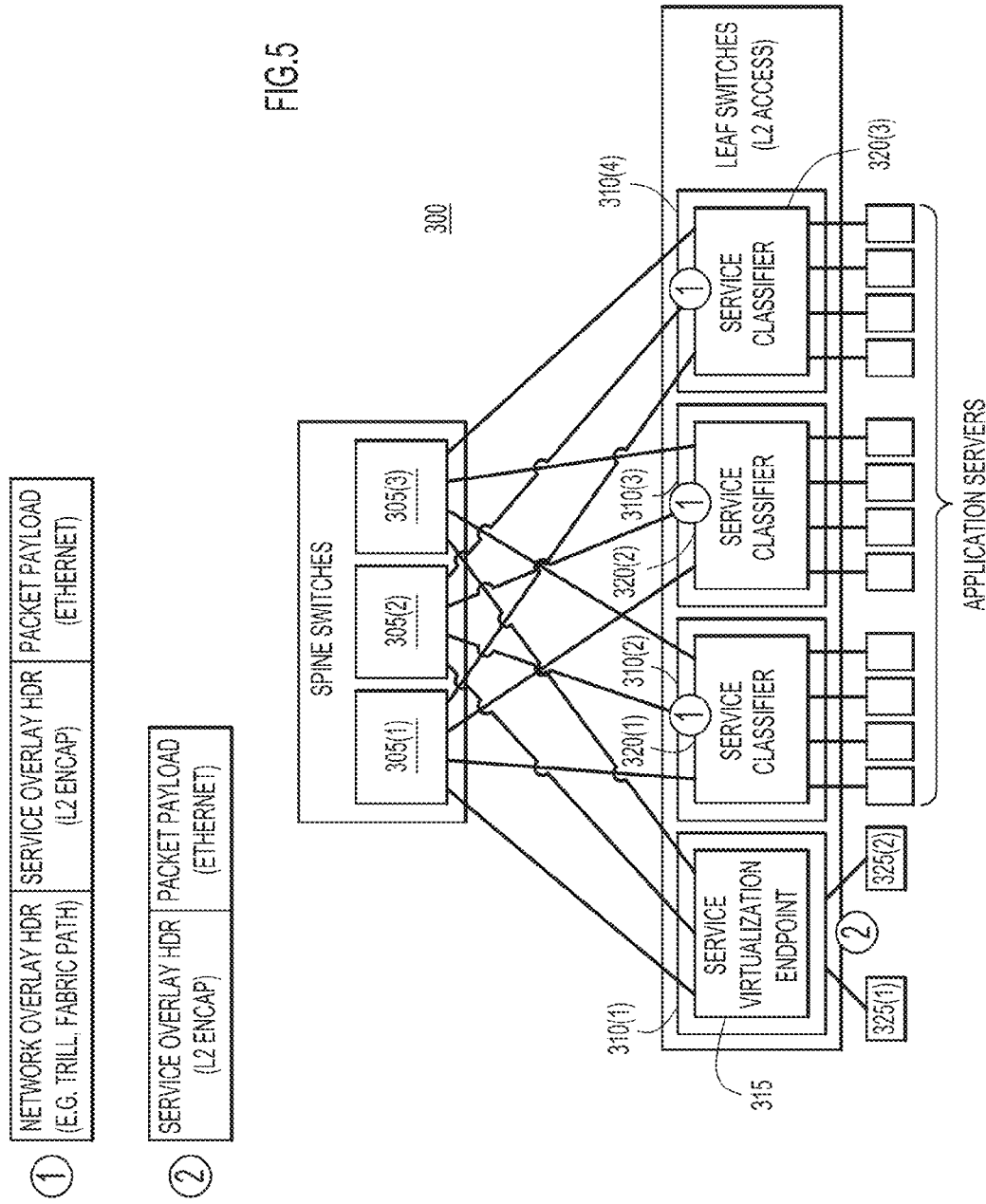
FIG. 5 is a block diagram of a computing network in which services are deployed using an example overlay-based packet steering technique.

FIG. 5 is an example of a portion of a computing network 300 comprising a spline and leaf architecture. That is, as shown, spline switches 305(1)-305(3) communicate with leaf switches 310(1)-310(4). Leaf switch 310(1) hosts a service virtualization endpoint 315, while leaf switches 310(2), 310(3), and 310(4) each host a service classifier 320(1), 320(2), and 320(3), respectively.

In the example of FIG. 5, service classifiers 320(1)-320(3) can communicate with service virtualization endpoint 315 through a network overlay (e.g., Fabric Path). As such, service classifiers 320(1)-320(3) are configured to encapsulate and transmit intercepted packets using the format of FIG. 2B (i.e., the encapsulation includes a network overlay header). However, because service nodes 325(1) and 325(2) are layer 2 adjacent to service virtualization endpoint 315, the service virtualization endpoint 315 decapsulates the received packets to remove the network overlay header, and, forwards the packets using a layer 2 encapsulation prior to transmission to the service nodes 325(1) and 325(2). The received packet from service classifiers 320(1)-320(3) includes the service overlay header (inside the Network Overlay Header) that has the necessary transport encapsulation to reach the service nodes 325(1) and 325(2).

Figure 6:
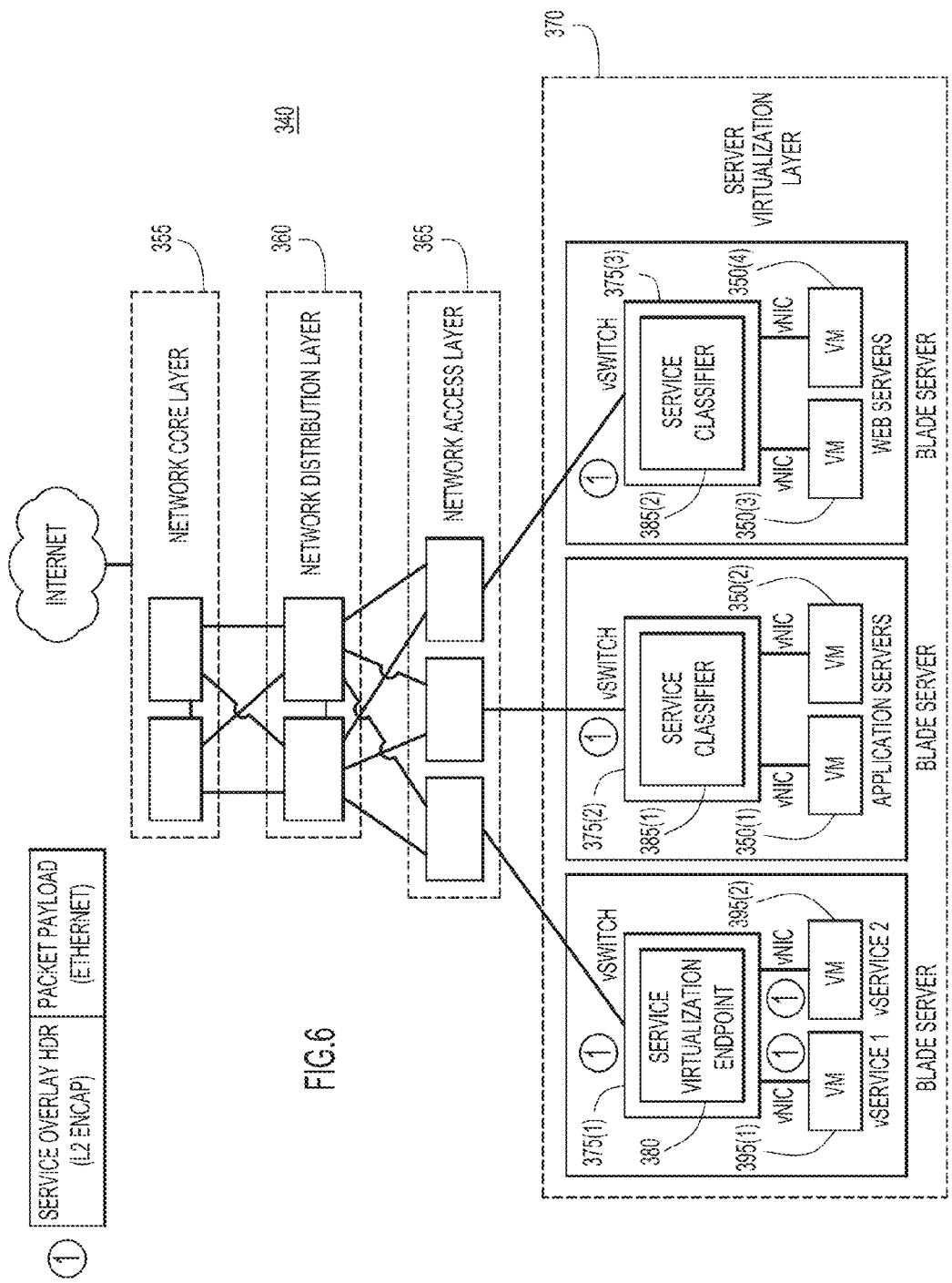
FIG. 6 is a block diagram of a computing network in which services are deployed using an example overlay-based packet steering technique.

FIG. 6 is an example of another computing network 340 having a service overlay topology in which the hops in the service path are layer 2 adjacent. In this example, traffic is bi-directionally transmitted between devices connected to the internet 345 and virtual machines 350(1)-350(4). Computing network 340 comprises a core layer 3 55, a distribution layer 3 60, an access layer 3 65, and a server virtualization layer 3 70.

As shown, within server virtualization layer 3 70 are virtual switches 375(1)-375(3). Virtual switch 375(1) hosts a service virtualization endpoint 380, while virtual switches 375(2) and 375(3) each host a service classifier 385(1) and 385(2), respectively. Similar to the examples described above, service classifiers 385(1) and 385(2) intercept service-directed packets and transmit these packets to service virtualization endpoint 380 for distribution to one or more of virtual service nodes 395(1) or 395(2).

As noted above, in the topology of FIG. 6, the hops are all layer 2 adjacent. As such, a layer 2 service overlay tunnel encapsulation is used in the overlay-based service path.

Figure 7:
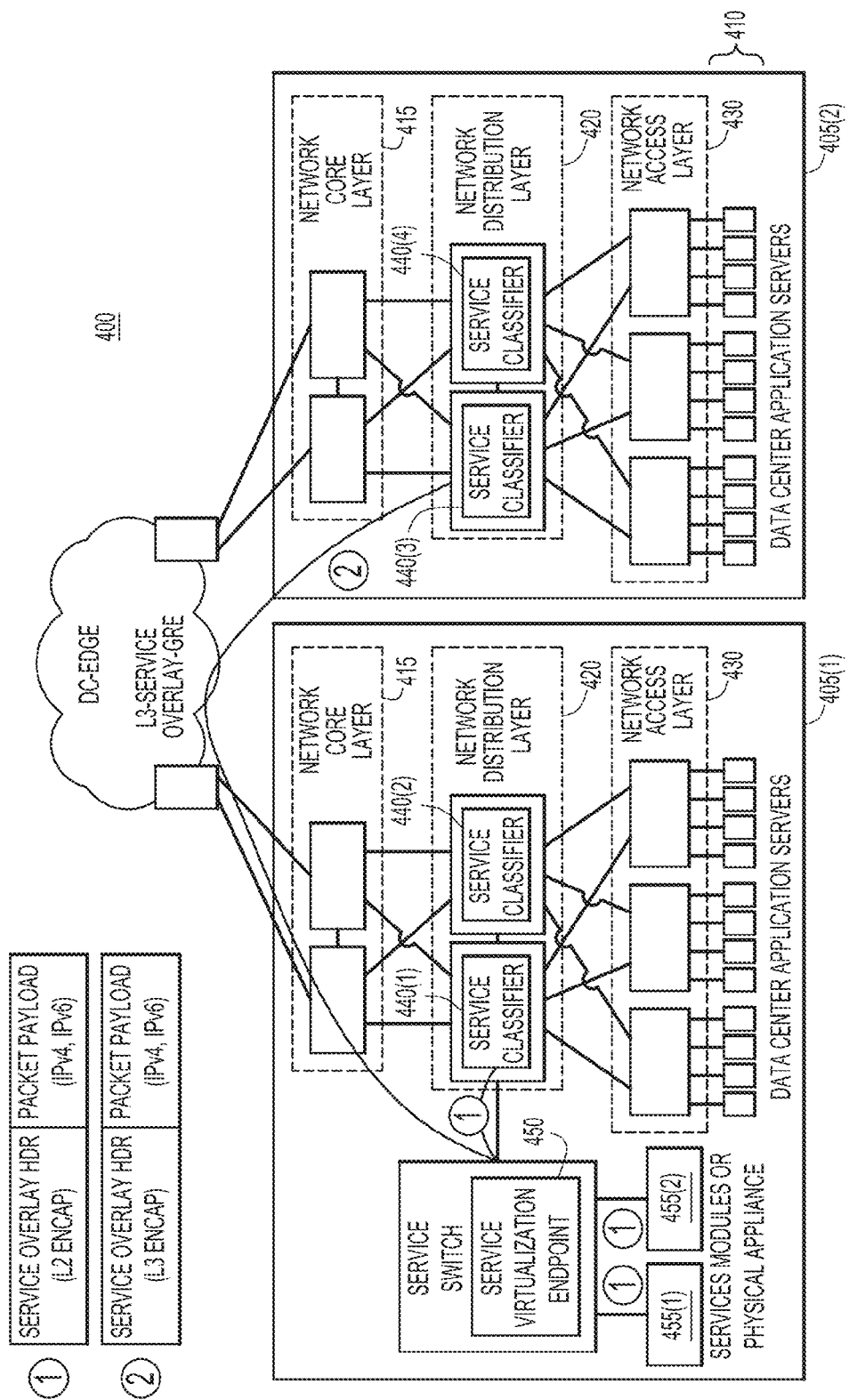
FIG. 7 is a block diagram of a computing network in which services are deployed using an example overlay-based packet steering technique.

FIG. 7 is an example of a still other computing network 400 that comprises devices in first and second data centers (pods) 405(1) and 405(2), respectively. Within each pod 405(1) and 405(2), traffic is bi-directionally transmitted between devices connected to the internet and application servers 410. Each pod 405(1) and 405(2) comprises a core layer 415, a distribution layer 420, and an access layer 430. The devices in distribution layer 420 (in both pods) each host a service classifier 440(1)-440(4). Similar to the examples described above, service classifiers 440(1)-440(4) are configured to intercept service-directed packets and transmit these packets to service virtualization endpoint 450 in pod 405(1) for distribution to one or more of service nodes 455(1) or 455(2).

In the example of FIG. 7, the network devices within pod 405(2) are layer 3 adjacent to service virtualization endpoint 450. As such, the service classifiers 440(3) and 440(4) are configured to encapsulate packets transmitted to service virtualization endpoint 450 with a layer 3 encapsulation (i.e., an IP/GRE tunnel is formed to redirect traffic to service virtualization endpoint 450). The service classifiers 440(1) and 440(2) are layer 2 adjacent to service virtualization endpoint 450 (in the same pod) and, as such, encapsulate packets transmitted to service virtualization endpoint 450 with a layer 2 encapsulation.

Figure 8:
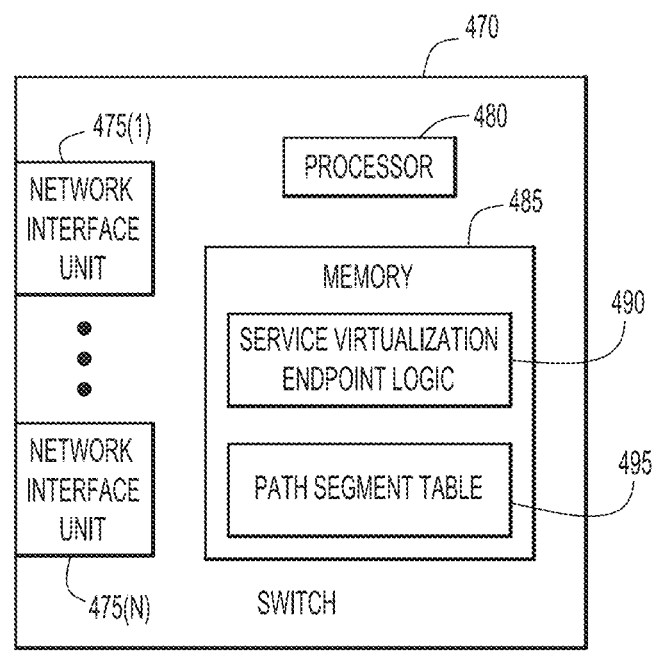
FIG. 8 is a block diagram of an example switch hosting a software-based service virtualization endpoint.

The service classifier, service virtualization endpoint, and service nodes may be implemented in hardware, software, or combinations thereof. That is, in one example, service classifier, service virtualization endpoint, and service nodes are implemented with digital logic gates in one or more application-specific integrated circuits (ASICs) on network devices or servers. However, in alternative arrangements, the operations of service classifier, service virtualization endpoint, and service nodes may be embodied in one or more software modules stored in memory. More specifically, FIG. 8 is a functional block diagram of a network switch 470 illustrating an example software implementation of a service virtualization endpoint.

As shown, switch 470 comprises a plurality of network interfaces 475(1)-475(N), a processor 480, and a memory 485. Memory comprises one or more software modules for service virtualization endpoint logic 490 and path segment table 495. Memory 485 may comprise read only memory (ROM), random access memory (RAM), magnetic disk storage media devices, optical storage media devices, flash memory devices, electrical, optical, or other physical/tangible (e.g., non-transitory) memory storage devices. The processor 480 is, for example, a microprocessor or microcontroller that executes instructions for the service virtualization endpoint logic 490 and access path segment table 495. Thus, in general, the memory 480 may comprise one or more tangible computer readable storage media (e.g., a memory device) encoded with software comprising computer executable instructions and when the software is executed (by the processor 480) it is operable to perform the operations described herein for a service virtualization endpoint.

Figure 9:
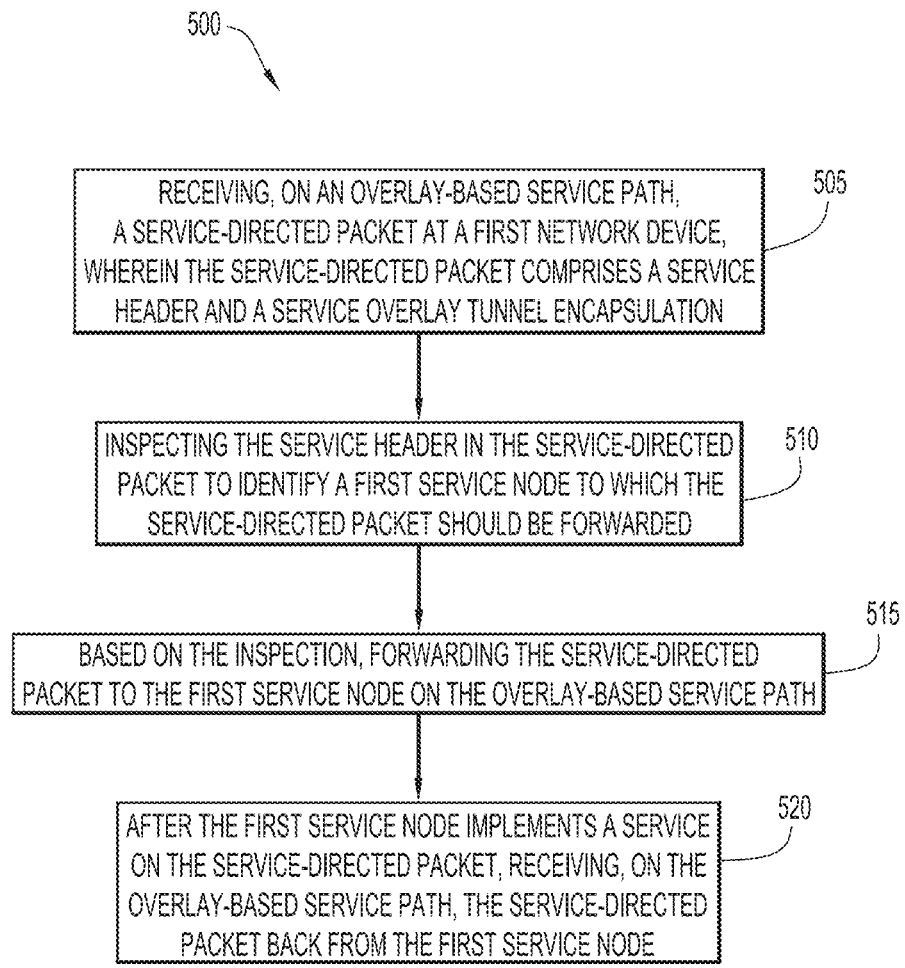
FIG. 9 is a high-level flowchart of a method implemented in accordance with an example overlay-based packet steering technique.

FIG. 9 is a high-level flowchart of a method 500 that may be implemented in accordance with an example overlay-based packet steering technique. Method 500 begins at 505 where, on an overlay-based service path, a service-directed packet is received at a first network device (service virtualization endpoint). The service-directed packet comprises a service header and a service overlay tunnel encapsulation added to the packet by a second network device enabled as a service classifier. In other words, the service classifier encapsulates the packet and inserts the packet into a service path to a service virtualization endpoint front ending one or more service nodes. At 510, the service virtualization endpoint inspects the service header in the service-directed packet to identify a first service node to which the service-directed packet should be forwarded. At 515, based on the inspection, the service virtualization endpoint forwards the service-directed packet to the first service node on the overlay-based service path. At 520, after the first service node applies a service on the service-directed packet, the service virtualization endpoint receives, on the overlay-based service path, the service-directed packet back from the first service node. The service-directed packet may then be sent (by inspecting the service header) to one or more additional service nodes for application of services thereto.

Overlay-based packet steering techniques may provide one or more advantages over conventional techniques. For example, the disclosed techniques may provide consistent services interception, redirection and chaining approach across a variety of services. The techniques may also decouple the services topology from the underlying network segmentation technology, thereby allowing easy addition and deletion of services in the network with minimal disruption. The techniques may also simplify services deployment by offloading common network functions from service nodes to the network infrastructure element (service virtualization endpoint) of the framework. This also allows tighter integration of the services to the network infrastructure. The techniques may also provide greater utilization of the service resources by providing mechanisms of tunneling network traffic for service consumption from remote networks which is not possible with conventional mechanisms. The techniques also enable newer deployments of service insertion, for example, redirection of traffic sourced and destined within the same layer 2 network segment to services. This may be important for enabling service insertion for server to server traffic in the same layer 2 segment in virtual data center where servers are hosted on virtual machines. The techniques may also improve network segment scalability by removing dependency on the network segmentation for service traffic redirection and service stitching. This may be important for service deployments for cloud where network segmentation like VLANs are scarce. Additionally, the presence of a service tag in the encapsulated packets, as described above, improves visibility in the data plane and provides a clear visibility into the processing stages of packets at any point in time in the network.

The above description is intended by way of example only.

What is claimed is:

1. A method comprising:
   receiving, on an overlay-based service path, a service-directed packet at a first network device, wherein the service-directed packet comprises a service header and a service overlay tunnel encapsulation;
   performing, based on information in the service header, a look-up in a path segment table to locate a next hop adjacency that includes next hop tunnel rewrite information useable to rewrite information in the tunnel encapsulation and identifies a first service node to which the service-directed packet should be forwarded;
   forwarding the service-directed packet to the first service node on the overlay-based service path; and
   after the first service node applies a service on the service-directed packet, receiving, on the overlay-based service path, the service-directed packet back from the first service node, wherein the service-directed packet received back from the first service node includes a modified service header.

2. The method of claim 1, wherein the service-directed packet was intercepted from a network flow intended for a destination device by a service classifier on a second network device and further comprising
   identifying, based on the look-up in the path segment table using information in the modified service header, the destination device as the next destination for the service directed packet; and
   forwarding the service-directed packet to the destination device.

3. The method of claim 2, further comprising:
prior to forwarding the service-directed packet to the destination device, de-encapsulating the service-directed packet.

4. The method of claim 1, wherein the service-directed packet was intercepted by a service classifier on a second network device, and wherein the method further comprises:
identifying, based on the look-up in the path segment table using information in the modified service header, the service classifier as the next destination for the service directed packet; and
forwarding the service-directed packet back to the service classifier on the overlay-based service path.

5. The method of claim 1, further comprising:
identifying, based on the look-up in the path segment table using information in the modified service header, a second service node as the next destination for the service directed packet; and
forwarding the service-directed packet to the second service node on the overlay-based service path.

6. The method of claim 1, wherein receiving a service-directed packet comprises:
receiving a service-directed packet having a layer 2 service overlay tunnel encapsulation.

7. The method of claim 6, wherein forwarding the service-directed packet to the first service node comprises:
forwarding the service-directed packet to the first service node with a layer 2 service overlay tunnel encapsulation.

8. The method of claim 6, further comprising:
encapsulating the service-directed packet with a layer 3 service overlay tunnel encapsulation; and
forwarding the service-directed packet having the layer 3 service overlay tunnel encapsulation to the first service node.

9. The method of claim 1, wherein receiving a service-directed packet comprises:
receiving a service-directed packet having a layer 3 service overlay tunnel encapsulation.

10. The method of claim 9, wherein forwarding the service-directed packet to the first service node comprises:
forwarding the service-directed packet to the first service node with a service overlay layer 3 tunnel encapsulation.

11. The method of claim 9, further comprising:
encapsulating the service-directed packet to include a layer 2 service overlay tunnel encapsulation; and
forwarding the service-directed packet having the layer 2 service overlay tunnel encapsulation to the first service node.

12. The method of claim 1, wherein performing the look-up in the path segment table based on the information in the service header of the service-directed packet comprises:
using a service path identifier (ID) and a sequence number in the service header to perform the look-up in the path forwarding table.

13. An apparatus comprising:
a plurality of network interfaces;
a processor coupled to the plurality of network interfaces and configured to:
receive, on an overlay-based service path, a service-directed packet that comprises a service header and a service overlay tunnel encapsulation;
perform, based on information in the service header, a look-up in a path segment table to locate a next hop adjacency that includes next hop tunnel rewrite information useable to rewrite information in the tunnel encapsulation and identifies a first service node to which the service-directed packet should be forwarded;
forward the service-directed packet to the first service node on the overlay-based service path; and
receive, on the overlay-based service path, the service-directed packet back from the first service node after the first service node applies a service on the service-directed packet, wherein the service-directed packet received back from the first service node includes a modified service header.

14. The apparatus of claim 13, wherein the service-directed packet was intercepted from a network flow intended for a destination device by a service classifier on a second network device and wherein the processor is configured to:
identify, based on the look-up in the path segment table using information in the modified service header, the destination device as the next destination for the service directed packet; and
forward the service-directed packet to the destination device.

15. The apparatus of claim 14, wherein the processor is configured to de-encapsulate the service-directed packet prior to forwarding the service-directed packet to the destination device.

16. The apparatus of claim 13, wherein the service-directed packet was intercepted by a service classifier on a second network device, and wherein the processor is configured to:
identify, based on the look-up in the path segment table using information in the modified service header, the service classifier as the next destination for the service directed packet; and
forward the service-directed packet back to the service classifier on the overlay-based service path.

17. The apparatus of claim 13, wherein the processor is configured to:
identify, based on the look-up in the path segment table using information in the modified service header, a second service node as the next destination for the service directed packet; and
forward the service-directed packet to the second service node on the overlay-based service path.

18. The apparatus of claim 13, wherein the processor is configured to receive a service-directed packet having a layer 2 service overlay tunnel encapsulation.

19. The apparatus of claim 18, wherein the processor is configured to forward the service-directed packet to the first service node with a layer 2 service overlay tunnel encapsulation.

20. The apparatus of claim 18, wherein the processor is configured to encapsulate the service-directed packet with a layer 3 service overlay tunnel encapsulation, and forward the service-directed packet having the layer 3 service overlay tunnel encapsulation to the first service node.

21. The apparatus of claim 13, wherein the processor is configured to receive a service-directed packet having a layer 3 service overlay tunnel encapsulation.

22. The apparatus of claim 21, wherein the processor is configured to forward the service-directed packet to the first service node with a service overlay layer 3 tunnel encapsulation.

23. The apparatus of claim 21, wherein the processor is configured to encapsulate the service-directed packet to include a layer 2 service overlay tunnel encapsulation, and forward the service-directed packet having the layer 2 service overlay tunnel encapsulation to the first service node.

24. The apparatus of claim 13, wherein to perform the look-up in the path segment table based on the information in the service header of the service-directed packet, the processor is configured to:
  use a service path identifier (ID) and a sequence number in the service header to perform the look-up in the path forwarding table.

25. The apparatus of claim 13, wherein the processor comprises one or more application-specific integrated circuits.

26. The apparatus of claim 13, wherein the processor is configured to execute software in memory to performs its operations.

27. One or more non-transitory computer readable storage media encoded with software comprising computer executable instructions and when the software is executed operable to:
  receive, on an overlay-based service path, a service-directed packet at a first network device, wherein the service-directed packet includes a service header and a service overlay tunnel encapsulation;
  perform, based on information in the service header, a look-up in a path segment table, to locate a next hop that includes next hop tunnel rewrite information useable to rewrite information in the tunnel encapsulation and identifies a first service node to which the service-directed packet should be forwarded;
  forward the service-directed packet to the first service node on the overlay-based service path; and
  receive, on the overlay-based service path, the service-directed packet back from the first service node after the first service node applies a service on the service-directed packet, wherein the service-directed packet received back from the first service node includes a modified service header.

28. The non-transitory computer readable storage media of claim 27, wherein the service-directed packet was intercepted from a network flow intended for a destination device by a service classifier on a second network device and wherein the computer readable storage media further comprise instructions operable to:
  identify, based on the look-up in the path segment table using information in the modified service header, the destination device as the next destination for the service directed packet; and
  forward the service-directed packet to the destination device after receiving the service-directed packet from the first service node.

29. The non-transitory computer readable storage media of claim 27, wherein the service-directed packet was intercepted by a service classifier on a second network device, and wherein the computer readable storage media further comprise instructions operable to:
  identify, based on the look-up in the path segment table using information in the modified service header, the service classifier as the next destination for the service directed packet; and
  forward the service-directed packet back to the service classifier on the overlay-based service path after receiving the service-directed packet from the first service node.

30. The non-transitory computer readable storage media of claim 27, further comprising instruction operable to:
  identify, based on the look-up in the path segment table using information in the modified service header, a second service node as the next destination for the service directed packet; and
  forward the service-directed packet to the second service node on the overlay-based service path.

\* \* \* \* \*